United States Patent [19]

Koerte

[11] 4,439,362
[45] Mar. 27, 1984

[54] AZO COMPOUNDS HAVING AT LEAST ONE 1,4-DIOXANYLMETHOXYCARBONYL-ALKYL OR -ALKOXYALKYL GROUP

[75] Inventor: Klaus Koerte, Ettingen, Switzerland

[73] Assignee: Sandoz Ltd., Basel, Switzerland

[21] Appl. No.: 813,485

[22] Filed: Jul. 7, 1977

[30] Foreign Application Priority Data

Jul. 12, 1977 [CH] Switzerland .................. 8904/76

[51] Int. Cl.³ .................. C09B 29/36; C09B 31/14; D06P 3/26; D06P 3/54
[52] U.S. Cl. .................. 260/152; 260/158
[58] Field of Search .................. 260/153, 158

[56] References Cited

U.S. PATENT DOCUMENTS

| | | | |
|---|---|---|---|
| 2,139,787 | 12/1938 | Wingler et al. | 260/152 X |
| 2,183,999 | 12/1939 | McNally et al. | 260/152 X |
| 2,227,977 | 1/1941 | McNally et al. | 260/152 |
| 2,373,700 | 4/1945 | McNally et al. | 260/205 |
| 3,970,617 | 7/1976 | Bruno | 260/152 |

FOREIGN PATENT DOCUMENTS

| | | | |
|---|---|---|---|
| 2116315 | 10/1971 | Fed. Rep. of Germany | 260/152 |
| 2304356 | 8/1973 | Fed. Rep. of Germany | 260/152 |
| 2510045 | 9/1975 | Fed. Rep. of Germany | 260/152 |

*Primary Examiner*—Floyd D. Higel
*Attorney, Agent, or Firm*—Gerald D. Sharkin; Richard E. Vila; Melvyn M. Kassenoff

[57] ABSTRACT

Compounds of the formula

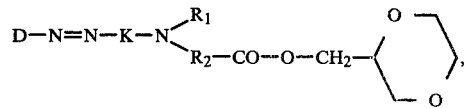

in which
D is a diazo component radical,
K is unsubstituted or substituted 1,4-phenylene or 1,4-naphthylene,
$R_1$ is, in the case where K is unsubstituted or substituted 1,4-phenylene, hydrogen, $(C_{1-4})$alkyl, $C_{2-4}$alkenyl,

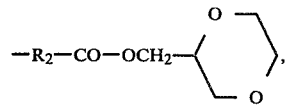

or $(C_{2-4})$alkyl or $(C_{2-4})$alkenyl monosubstituted by chlorine, bromine, hydroxy, cyano, $(C_{1-4})$alkoxy, phenoxy, phenyl, formyloxy, alkyl$(C_{1-4})$carbonyloxy, benzoyloxy, alkoxy$(C_{1-4})$carbonyl, alkoxy$(C_{1-4}$alkoxy)carbonyloxy, mono$(C_{1-4}$-alkyl)aminocarbonyloxy or dialkyl$(C_{1-4})$aminocarbonyloxy, or in the case where K is unsubstituted or substituted 1,4-naphthylene, $R_1$ is hydrogen, $C_{1-4}$alkyl or $(C_{2-4})$alkenyl,
$R_2$ is $(C_{1-4})$alkylene or $C_{2-4}$alkylene-O-$C_{2-4}$alkylene, and where $R_1$ is

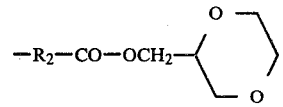

the $R_2$'s are identical, are useful as disperse dyes for dyeing and printing synthetic and semi-synthetic, hydrophobic, high molecular weight organic materials such as linear aromatic polyesters, cellulose 2½ acetate, cellulose triacetate and synthetic polyamides. The obtained dyeings possess notable fastness to light, sublimation, pressing and wet treatments.

7 Claims, No Drawings

AZO COMPOUNDS HAVING ONE OR TWO 1,4-DIOXANYLMETHOXYCARBONYL-ALKYL OR -ALKOXYALKYL GROUPS

The present invention relates to azo compounds, their preparation and use.

Accordingly, the present invention provides azo compounds of formula I,

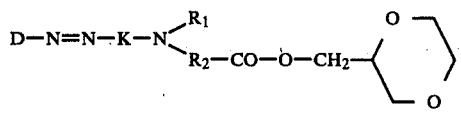

in which
D is a diazo component radical,
K is 1,4-phenylene or 1,4-naphthylene,
$R_1$ is, in the case where K is 1,4-phenylene, hydrogen, $(C_{1-4})$alkyl, $(C_{2-4})$ alkenyl,

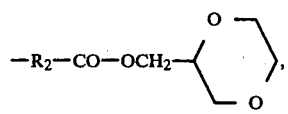

or $(C_{2-4})$alkyl or $(C_{2-4})$alkenyl monosubstituted by chlorine, bromine, hydroxy, cyano, $(C_{1-4})$alkoxy, phenoxy, phenyl, formyloxy, alkyl$(C_{1-4})$carbonyloxy, benzoyloxy, alkoxy$(C_{1-4})$carbonyl, $(C_{1-4}$alkoxy)carbonyloxy, mono$(C_{1-4}$alkyl)aminocarbonyloxy(mono$(C_{1-4}$alkyl)carbamoyloxy) or dialkyl$(C_{1-4})$aminocarbonyloxy, or in the case where K is 1,4-naphthylene, $R_1$ is hydrogen, $C_{1-4}$alkyl or $(C_{2-4})$alkenyl,
$R_2$ is $(C_{1-4})$alkylene or $C_{2-4}$alkylene-O-$C_{2-4}$alkylene, and where $R_1$ is

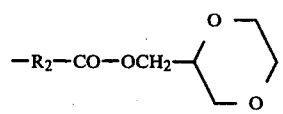

the $R_2$'s are identical,
which compounds are useful as disperse dyes.

It will be appreciated that the 1,4-phenylene and 1,4-naphthalene components may be further substituted by substituents common in the chemistry of azo disperse dyestuffs. However, the compounds should not, of course, contain substituents or combinations of substituents which would deleteriously affect the dyeing properties, for example sulphonic acid groups, or would present steric or stability problems, for example groupings such as

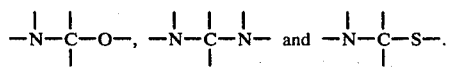

The diazo component of the azo compounds may be of the carbocyclic or heterocyclic series and may be monoazo or disazo.

Preferred compounds are those wherein the diazo component radical is substituted phenyl having a total of up to 3 substituents selected from the group consisting of chlorine, bromine, iodine, nitro, cyano, methyl, methylsulphonyl (up to two of each of these), methoxy, formyl, alkyl$(C_{1-2})$carbonyl, alkoxy$(C_{1-2})$carbonyl, benzoyl, thiocyano, tolylsulphonyl, aminosulphonyl, $(C_{1-2})$alkylaminosulphonyl, di$(C_{1-2})$alkylaminosulphonyl, aminocarbonyl, alkyl$(C_{1-2})$aminocarbonyl, dialkyl$(C_{1-2})$aminocarbonyl, phenylaminocarbonyl, trifluoromethyl, phenyl, alkyl$(C_{1-2})$carbonylamino, unsubstituted phenylazo, dichlorophenylazo, dinitrophenylazo, monochloro and/or nitro substituted phenylazo (only one of each of these); substituted thienyl having a total of up to three substituents selected from the group consisting of chlorine, bromine, nitro, cyano, methyl (up to two of each of these), phenyl, alkyl$(C_{1-2})$carbonyl and $(C_{1-2})$aloxycarbonyl (only one of each of these); thiazolyl, benzothiazolyl or benzisothiazolyl each of which is unsubstituted or substituted by a total of up to two substituents selected from the group consisting of chlorine, bromine, nitro, cyano (up to two of each of these), methyl, thiocyano, aminosulphonyl and $C_{1-2}$alkylsulfonyl (only one of each of these); or phenyl-(1,3,4) or (1,3,5)-thiadiazolyl-2.

Representative preferred compounds of formula I include those wherein D is substituted phenyl having 1 to 3 substituents, as defined above, with the priviso that one and only one substituent is selected from the group consisting of phenylazo, chlorophenylazo, nitrophenylazo, dichlorophenylazo, dinitrophenylazo and chloronitrophenylazo, and those wherein D is one of the aforementioned heterocyclic diazo component radicals.

Preferably, the diazo component radical is a substituted phenyl as defined above, with chlorine, bromine, iodine, nitro, cyano, methyl methylsulphonyl, methoxy, alkyl$(C_{1-2})$carbonylamino, aminosulphonyl, $(C_{1-2})$alkylaminosulphonyl, di$(C_{1-2})$alkylaminosulphonyl and 2-chloro-4-nitrophenylazo being the preferred substituents.

Preferred compounds are those of formula I'

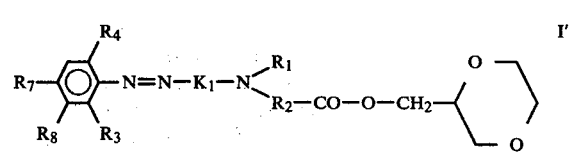

in which
$R_1$ and $R_2$ are as defined above,
$R_3$ is hydrogen, chlorine, bromine, iodine, methylsulphonyl or cyano,
$R_4$ is hydrogen, chlorine, bromine, iodine, nitro, methyl, methoxy, cyano or trifluoromethyl,
$R_7$ is nitro, methylsulphonyl, aminosulphonyl, methylaminosulphonyl, dimethylaminosulphonyl or 2-chloro-4-nitrophenylazo,
$R_8$ is hydrogen, chlorine, bromine, methyl, methoxy or alkyl$(C_{1-2})$carbonylamino, with the proviso that $R_8$ is hydrogen when $R_3$ is other than hydrogen, and
$K_1$ is unsubstituted 1,4-naphthylene or a group of formula VI,

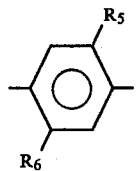

VI in which
R$_5$ is hydrogen, chlorine, bromine, methyl, methoxy or ethoxy, and
R$_6$ is hydrogen, chlorine, bromine, methyl, methoxy, ethoxy, alkyl(C$_{1-2}$) carbonylamino or chloroacetylamino.

Representative compounds of formula I' include those wherein K$_1$ is a group of formula VI.

Preferably, R$_1$ is R$_1'$ where R$_1'$, in the case where K$_1$ is a radical of formula VI, is hydrogen; unsubstituted (C$_{2-4}$)alkyl (preferably ethyl); allyl;

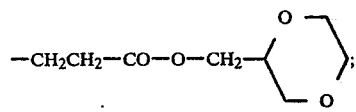

(C$_{2-4}$)alkyl (preferably ethyl) monosubstituted by chlorine, bromine, hydroxy, cyano, (C$_{1-2}$)alkoxy, phenoxy, phenyl, formyloxy, alkyl(C$_{1-3}$)carbonyloxy, benzoyloxy, alkoxy(C$_{1-2}$)carbonyl, alkoxy(C$_{1-2}$)carbonyloxy, (C$_{1-2}$)alkylaminocarbonyloxy or di(C$_{1-2}$)alkylaminocarbonyloxy and, in the case where K$_1$ is 1,4-naphthylene, R$_1'$ is hydrogen or (C$_{2-4}$)alkyl (preferably ethyl).

More preferably, R$_1$ is R$_1''$, where R$_1''$, in the case where K$_1$ is a radical of formula VI, is hydrogen, ethyl, cyanoethyl or acetoxyethyl, or in the case where K$_1$ is 1,4-naphthylene, R$_1''$ is hydrogen or ethyl.

Even more preferably, R$_1$ is R$_1'''$, where R$_1'''$, in the case where K$_1$ is a radical of formula VI, is hydrogen or ethyl or, in the case where K$_1$ is 1,4-naphthylene, R$_1'''$ is hydrogen.

The alkylene radicals or alkylene-O-alkylene radicals as R$_2$ may be straight chain or branched.

Preferably, R$_2$ is R$_2'$, where R$_2'$ is a straight chain (C$_{1-4}$)alkylene, —CH(CH$_3$)CH$_2$—, —CH$_2$—CH(CH$_3$)— or —CH$_2$CH$_2$—O—CH$_2$CH$_2$—, with —CH$_2$CH$_2$— being especially preferred.

R$_3$ is preferably R$_3'$, where R$_3'$ is hydrogen, chlorine, bromine or methylsulphonyl.

R$_4$ is preferably R$_4'$, where R$_4'$ is chlorine, bromine or nitro.

R$_5$ is preferably R$_5'$, where R$_5'$ is hydrogen, methoxy or ethoxy.

R$_6$ is preferably R$_6'$, where R$_6'$ is hydrogen, chlorine, methyl, methoxy or acetylamino.

R$_7$ is preferably nitro.

R$_8$ is preferably R$_8'$, where R$_8'$ is hydrogen or chlorine, with the proviso that R$_8'$ is only chlorine when R$_3$ is hydrogen.

Preferred compounds of formula I', are those where R$_1$ is R$_1'$, preferably R$_1''$, more preferably R$_1'''$, with those compounds where R$_2$ is R$_2'$, R$_3$ is R$_3'$, R$_4$ is R$_4'$, R$_5$ is R$_5'$, R$_6$ is R$_6'$, R$_7$ is nitro and R$_8$ is R$_8'$ being especially preferred.

The most preferred compounds of formula I' are those where R$_1$ is R$_1'''$, R$_2$ is —CH$_2$CH$_2$—, R$_3$ is R$_3'$, R$_4$ is R$_4'$, R$_5$ is R$_5'$, R$_6$ is R$_6'$, R$_7$ is nitro and R$_8$ is R$_8'$.

The present invention also provides a process for the production of azo compounds of formula I, as defined above, comprising (a) coupling a diazonium derivative of an amine of the formula

D-NH$_2$ with a coupling component of formula V,

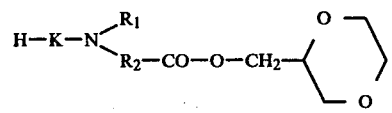

or (b) reacting a compound of formula II

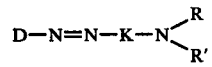

with a compound of formula III,

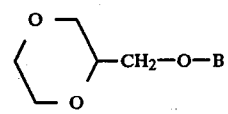

in which compounds
D is a diazo component radical,
R is R$_1$ as defined above, or —R$_2$—COOH or a functional derivative thereof,
and R' is hydrogen or —R$_2$—COOH or a functional derivative thereof,
B is hydrogen, —COR$_2$Hal or —COCR''=CHR'' where each R'' is hydrogen or one is hydrogen and the other is methyl, with the proviso that B and R' are not both hydrogen.

The coupling reaction of process (a) may be carried out in accordance with known methods.

The reactions of the compounds of formula II with those of formula III may be carried out in accordance with conventional methods. It will be appreciated that where R is —R$_2$COOH or a functional derivative thereof the compounds of formula III and formula II are employed in at least 2:1 molar ratio. Suitable functional derivatives of —R$_2$COOH are the acid chlorides.

The compounds of formula V may be prepared by condensing an ester of formula IV,

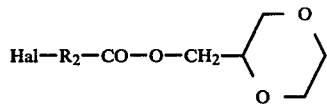

with an amine of formula VII

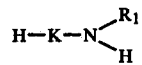

in the presence of an acid binding agent or by condensing a compound of formula VIII or IX,

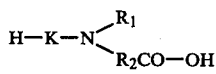   VIII

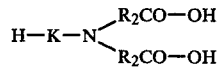   IX with the alcohol of formula X,

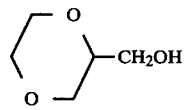   X

The condensation reaction may be carried out in accordance with known methods. Suitably, the compounds of formula V are prepared by heating an amine of formula VII with acrylic or crotonic acid in the presence of an excess of the alcohol of formula X. The reaction is conducted in acid medium, for example in the presence of toluenesulphonic acid, $BF_3$ or sulphuric acid.

The compounds of formulae II, III, IV, VII, VIII and IX are either known or may be prepared in accordance with conventional methods from available starting materials.

The compound of formula X may also be prepared in accordance with known methods by heating $ClCH_2CH_2OCH_2CHOHCH_2Cl$ with dilute sodium hydroxide solution.

The azo compounds according to the present invention are useful as disperse dyes for dyeing or printing textiles of synthetic or semi-synthetic, hydrophobic, high molecular weight organic materials from an aqueous suspension. They are especially useful for dyeing or printing textiles of linear, aromatic polyesters, cellulose 2½ acetate, cellulose triacetate and synthetic polyamides. The substrate may be in loose fibre, yarn or fabric form.

The compounds may be made up into dyeing preparations in accordance with known methods, for example by grinding in the presence of dispersing agents and/or fillers, with subsequent spray or vacuum drying. The dyestuff preparations may be used for exhaust dyeing, pad dyeing or printing. Dyeing and printing may be carried out in accordance with known methods, for example, as described in French Pat. No. 1,445,371.

The dyestuffs may be obtained in polymorphic thermounstable form. If such is the case, they are advantageously modifed into the thermostable form in accordance with known methods, for example by stirring in water in temperatures between 20° and 100° C. in the presence of an organic solvent or by recrystallization, etc.

The dyeings obtained with the dyestuffs according to the present invention possess notable fastness to light, sublimation and pressing. Furthermore, they are notably wet fast.

The following Examples further serve to illustrate the invention. In the Examples all parts are parts by weight and all temperatures are in degrees Centigrade.

EXAMPLE 1

(a) Preparation of N-[β-(1,4-dioxanylmethoxycarbonyl)ethyl]-α-naphthylamine

7 Parts of anhydrous acrylic acid are added over the course of 15 minutes at 85° to a mixture of 14.3 parts α-naphthylamine and 23.6 parts 2-hydroxymethyl-1,4-dioxane. Subsequently, the mixture is stirred for 15 hours at 95°. After cooling, 6 parts p-toluenesulphonic acid and 30 parts toluene are added and the reaction mixture is heated to boiling temperature whereby the azeotrope of toluene and water is distilled off. After completion of the reaction, the mixture is cooled and washed with a dilute sodium bicarbonate solution and water. The organic phase is separated and freed from toluene whereby the oil N-[β-(1,4dioxanyl-methoxycarbonyl)-ethyl]-α-naphthylamine is obtained.

8 Parts of crystallized sodium nitrite are slowly added under stirring at 60° to 147 parts of concentrated sulphuric acid. The solution is cooled to 10°–20°, 10 parts of glacial acetic acid are added thereto and, after further cooling to 0°–5°, 26.2 parts of 2-bromo-4,6-dinitroaniline are added. The reaction mixture is set with a further 10 parts of glacial acetic acid and stirred for 3 hours at 0°–5°, the excess nitrosyl sulphuric acid being eliminated with urea. The obtained diazonium salt solution is slowly added dropwise, with stirring, to a solution of 31.5 parts the N-(1,4-dioxanyl-β-methoxycarbonylethyl)-α-naphthylamine in 100 parts of 3% hydrochloric acid cooled to 0°–5°. After coupling is complete the dyestuff is precipitated with 500 parts of ice water, stirred for 1 hour, filtered and washed free of acid. In order to improve the dyeing properties and the stability of the dispersions, the dyestuff is added to 100 parts of water, stirred for 3–5 hours at 90°, filtered again, washed with water and dried. The dyestuff dyes polyester fibres in blue shades.

In the following Table further dyestuffs, which can be prepared in analogous manner to the procedure given above, are given. The dye shade on polyester fibre is indicated in every case.

TABLE 1

Structure:

$$\underset{R_4}{\overset{R_5}{\text{Ar}}}-N=N-\underset{R_7}{\overset{R_3}{\text{Ar}}}-\underset{R_6}{\overset{R_1}{N}}-R_2-C(=O)-O-CH_2-\text{(1,3-dioxolan-2-yl)}$$

| Example No. | R₁ | R₂ | R₃ | R₄ | R₅ | R₆ | R₇ | Shade on polyester |
|---|---|---|---|---|---|---|---|---|
| 2 | —C₂H₅ | —CH₂—CH₂— | H | H | H | —CH₃ | —NO₂ | red |
| 3 | —CH₂CH₂CN | —CH₂CH₂CH₂— | H | Cl | H | H | —SO₂CH₃ | orange |
| 4 | H | —CH₂CH₂— | —Br | —NO₂ | —OC₂H₅ | —NHCOCH₃ | —NO₂ | blue |
| 5 | H | " | " | —CN | —OCH₃ | —NHCOC₂H₅ | " | " |
| 6 | n-C₄H₉ | —CH₂—CH(CH₃)— | H | —NO₂ | " | —CH₃ | " | violet |
| 7 | H | —CH₂— | —SO₂CH₃ | —CN | H | —NHCOCH₃ | " | blue |
| 8 | H | —(CH₂)₄— | Cl | —NO₂ | —OC₂H₅ | —CH₃ | " | brown |
| 9 | —CH₂CH₂OCOCH₃ | —(CH₂)₂— | —Br | Cl | H | H | " | scarlet |
| 10 | —C₂H₅ | —(CH₂)₃— | H | Br | Cl | —CH₃ | C₆H₅—N=N— | yellowish-brown |
| 11 | —CH₂CH₂—OCH₃ | " | Br | " | " | " | —CONH₂ | red |
| 12 | H | —CH₂— | H | Cl | H | —NHCOCH₃ | —SO₂CH₃ | red |
| 13 | —C₂H₅ | —CH₂—CH₂— | H | —CH₃ | H | H | —NO₂ | red |
| 14 | —CH₂—CH=CH₂ | " | —SO₂—C₆H₄—CH₃ (p) | —CN | H | —CH₃ | " | blue |
| 15 | —C₂H₄OCHO | " | —CHO | Cl | H | H | " | red |
| 16 | —C₂H₅ | " | —COCH₃ | " | Cl | H | " | " |
| 17 | H | " | —COC₂H₅ | Br | —OCH₃ | —NHCOCH₃ | " | violet |
| 18 | —C₂H₄Cl | " | —COOCH₃ | " | " | Cl | " | red |
| 19 | H | " | —COOC₂H₅ | H | H | —CH₃ | " | " |
| 20 | H | " | —COC₆H₅ | Cl | " | " | " | " |
| 21 | —C₂H₄—OCO—C₂H₅ | —CH₂—CH₂—CH₂— | —COCH₂—C₆H₅ | " | " | " | —SO₂NH₂ | violet |
| 22 | —C₂H₄—O—COC₄H₉ | —CH₂—CH₂— | —CO(CH₂)₂—C₆H₅ | Br | " | —NHCOCH₃ | —SO₂NH—CH₃ | orange |
| 23 | H | " | —SCN | H | " | " | —SO₂NHC₂H₅ | red |
| 24 | —C₂H₄—O—C₂H₅ | " | H | H | " | Cl | —CONHCH₃ | " |
| 25 | H | " | H | " | " | —CH₃ | —CON(CH₃)₂ | " |
| 26 | —C₂H₄—O—C₆H₅ | " | Cl | " | " | " | —CONHC₂H₅ | violet |
| 27 | H | " | H | " | " | —NHCOCH₃ | —CON(CH₃)₂ | orange |
| 28 | " | " | H | " | " | " | —CON(C₂H₅)₂ | red |
| 29 | —C₂H₄OH | " | " | " | " | —CH₃ | —CONHC₆H₅ | " |
| 30 | H | " | Cl | " | " | " | " | orange |
| 31 | " | " | " | " | " | —NHCOCH₃ | " | brown |
| 32 | — | " | " | " | —OCH₃ | —CH₃ | —C₆H₅ | orange |
| 33 | —C₂H₄C₆H₅ | " | " | H | " | —CH₃ | —N=N—(2-Cl,4-NO₂-C₆H₃) | red |

TABLE 1-continued

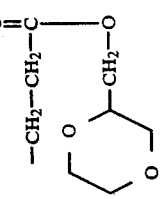

| Example No. | R$_1$ | R$_2$ | R$_3$ | R$_4$ | R$_5$ | R$_6$ | R$_7$ | Shade on polyester |
|---|---|---|---|---|---|---|---|---|
| 34 | H | —CH$_2$CH$_2$— | H | Cl | —OCH$_3$ | —CH$_3$ | —CON⟨$_{C_6H_5}^{C_2H_5}$ | orange |
| 35 | H | —(CH$_2$)$_3$— | H | —CF$_3$ | —CH$_3$ | " | —NO$_2$ | red |
| 36 | H | —CH$_2$CH$_2$— | I | —NO$_2$ | —OC$_2$H$_5$ | —NHCOCH$_2$Cl | " | blue |
| 37 | H | " | H | Cl | H | —CH$_3$ | " | red |
| 38 | —C$_2$H$_5$ | —CH$_2$CH$_2$—OCH$_2$CH$_2$— | H | H | H | " | —NO$_2$ | orange |
| 39 | H | —CH$_2$CH$_2$— | H | H | H | Cl | " | red |
| 40 | H | " | H | Cl | H | —OCH$_3$ | " | bluish red |
| 41 | —C$_2$H$_5$ | " | H | —CN | —OCH$_3$ | H | " | violet |
| 42 | H | " | H | Cl | H | —CH$_3$ | " | red |
| 43 | —C$_2$H$_5$ | " | H | Cl | —OCH$_3$ | H | " | bluish red |
| 44 | H | " | Br | —NO$_2$ | " | —CH$_3$ | " | reddish blue |
| 45 | H | " | H | Cl | H | Cl | " | scarlet |
| 46 | H | " | | | | | | |

TABLE 2

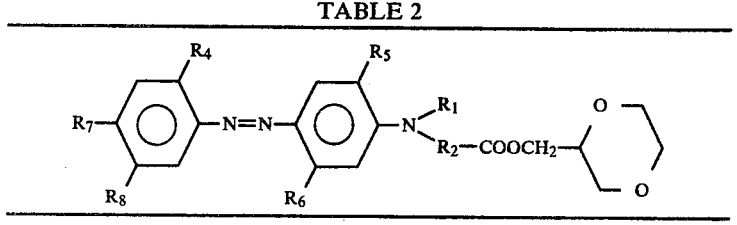

| Example No. | $R_1$ | $R_2$ | $R_4$ | $R_5$ |
|---|---|---|---|---|
| 47 | —$C_2H_5$ | —$CH_2CH_2$— | Cl | H |
| 48 | " | —$(CH_2)_4$— | " | H |
| 49 | —$C_2H_4$—O—CO—$C_6H_5$ | —$CH_2$—$CH_2$— | —$NO_2$ | —$OC_2H_5$ |
| 50 | —$C_2H_4$—CO—$OCH_3$ | " | " | —$OCH_3$ |
| 51 | —$C_2H_4$—CO—$OC_2H_5$ | " | —$CH_3$ | H |
| 52 | —$C_2H_4$—O—CO—O—$CH_3$ | " | —$OCH_3$ | " |
| 53 | —$C_2H_4$—O—CO—$OC_2H_5$ | " | Cl | " |

| Example No. | $R_6$ | $R_7$ | $R_8$ | Shade on polyester |
|---|---|---|---|---|
| 47 | —$CH_3$ | —$SO_2N(CH_3)_2$ | —Cl | red |
| 48 | —$NHCOCH_3$ | —$NO_2$ | —Cl | " |
| 49 | " | " | —$NHCOCH_3$ | blue |
| 50 | " | " | —$NHCOC_2H_5$ | " |
| 51 | —$CH_3$ | $O_2N$—C$_6H_3$(Cl)—N=N— | —$CH_3$ | red |
| 52 | " | —$NO_2$ | —$OCH_3$ | " |
| 53 | " | " | —Cl | " |

TABLE 3

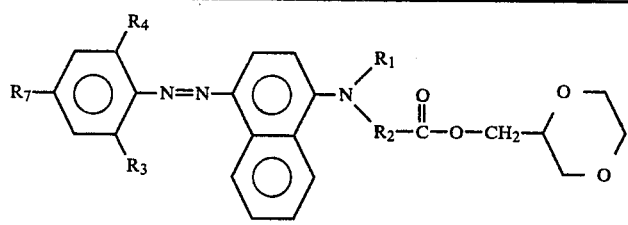

| Example No. | $R_1$ | $R_2$ | $R_3$ | $R_4$ | $R_7$ | Shade on polyester |
|---|---|---|---|---|---|---|
| 54 | H | —$CH_2CH_2$— | Br | —$NO_2$ | —$NO_2$ | blue |
| 55 | H | " | " | —CN | " | " |
| 56 | —$C_2H_5$ | —$(CH_2)_3$— | Cl | —$NO_2$ | " | " |
| 57 | H | —$CH(CH_3)$—$CH_2$— | I | " | " | " |
| 58 | H | —$CH_2CH_2$— | —$SO_2CH_3$ | " | " | " |
| 59 | H | —$CH_2$— | " | —CN | " | " |
| 60 | H | —$(CH_2)_4$— | —CN | " | " | " |
| 61 | H | —$CH_2CH_2$—O—$CH_2CH_2$— | Br | —$NO_2$ | " | " |
| 62 | —$C_4H_9$ | —$CH_2$—$CH_2$— | " | " | " | " |

TABLE 4

Structure: R9/R10-substituted benzothiazole-N=N-phenyl(R5,R6)-N(R1)(R2-C(=O)-O-CH2-dioxane)

| Example No. | R₁ | R₂ | R₅ | R₆ | R₉/R₁₀ | Shade on polyester |
|---|---|---|---|---|---|---|
| 63 | —CH₂CH₂—CN | —CH₂CH₂— | H | —NHCOCH₃ | 6 - CN | red |
| 64 | —CH₂CH₂—OCOCH₃ | —(CH₂)₃— | H | —CH₃ | 6 - SO₂CH₃ | " |
| 65 | —CH₂CH₂—OCH₃ | —CH₂CH₂— | H | —NHCOCH₃ | 4,6-di-NO₂ | blue |
| 66 | H | " | H | " | 4-Cl, 6-CN | violet |
| 67 | n-C₄H₉ | " | —OCH₃ | —CH₃ | 6 - NO₂ | " |
| 68 | —C₂H₅ | " | H | " | 6 - Cl | red |
| 69 | —CH₂CH₂—CN | " | H | —NHCOCH₃ | 6-SO₂NH₂ | " |
| 70 | H | " | —OC₂H₅ | " | 6 - SCN | violet |
| 71 | —CH₂CH₂—COO—CH₂-(dioxane) | " | H | —CH₃ | 6-SO₂CH₃ | red |

TABLE 5

Structure: R12,R13-substituted thiazole-N=N-phenyl(R5,R6)-N(R1)(R2-C(=O)-O-CH2-dioxane)

| Example No. | R₁ | R₂ | R₅ | R₆ | R₁₂ | R₁₃ | Shade on polyester |
|---|---|---|---|---|---|---|---|
| 72 | —C₂H₅ | —CH₂—CH₂— | H | —CH₃ | Cl | Cl | blue |
| 73 | H | " | —OC₂H₅ | —NHCOCH₃ | Br | Br | " |
| 74 | H | " | —OCH₃ | —CH₃ | Cl | —NO₂ | " |
| 75 | H | " | H | —Cl | Br | —CN | " |
| 76 | H | " | H | —CH₃ | H | —SO₂C₂H₅ | " |
| 77 | H | " | —OCH₃ | " | —CN | —CN | " |

TABLE 6

Structure: R11,R12,R13-substituted benzisothiazole-N=N-phenyl(R5,R6)-N(R1)(R2-C(=O)-O-CH2-dioxane)

| Example No. | R₁ | R₂ | R₅ | R₆ | R₁₁ | R₁₂ | R₁₃ | Shade on polyester |
|---|---|---|---|---|---|---|---|---|
| 78 | —CH₂—CH₂—OCOCH₃ | —CH₂—CH₂— | H | —NHCOCH₃ | Br | H | Br | blue |
| 79 | —C₂H₄—O—CO—NHCH₃ | " | H | " | Cl | H | Cl | " |
| 80 | —C₂H₄—O—CO—NHC₂H₅ | " | H | —CH₃ | " | H | —CN | " |
| 81 | —C₂H₄—O—CO—N(CH₃)₂ | " | H | —NHCOCH₂CH₂Cl | H | Br | H | " |
| 82 | H | " | H | —CH₃ | —SO₂C₂H₅ | H | H | " |
| 83 | —C₂H₄—O—CO—N(C₂H₅)₂ | " | —OCH₃ | —NHCOCH₃ | —CN | H | —CN | " |

TABLE 7

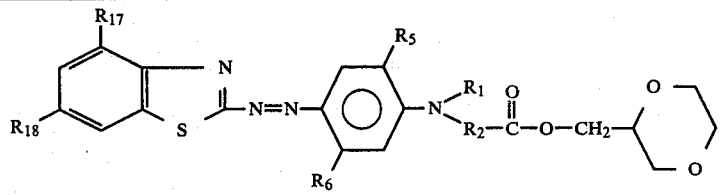

| Example No. | R₁ | R₂ | R₅ | R₆ | R₁₇ | R₁₈ | Shade on polyester |
|---|---|---|---|---|---|---|---|
| 84 | H | —C₂H₄— | H | Cl | Cl | Cl | red |
| 85 | —C₂H₅ | " | —OCH₃ | —CH₃ | H | —SO₂—C₂H₅ | " |
| 86 | H | " | H | H | Br | Cl | " |
| 87 | —C₂H₅ | " | H | H | " | Br | " |
| 88 | H | " | H | Br | —CH₃ | —CN | " |
| 89 | —C₂H₄OH | " | H | —NHCOCH₃ | —CN | " | " |
| 90 | H | " | —OC₂H₅ | " | H | —NO₂ | bluish-red |

TABLE 8

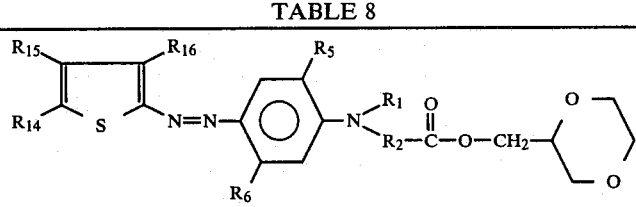

| Example No. | R₁ | R₂ | R₅ | R₆ | R₁₄ | R₁₅ | R₁₆ | Shade on polyester |
|---|---|---|---|---|---|---|---|---|
| 91 | H | —CH₂—CH₂— | H | H | —NO₂ | H | —CN | red |
| 92 | H | " | —OC₂H₅ | —NHCOCH₃ | —CN | —CH₃ | " | blue |
| 93 | H | " | " | Cl | —NO₂ | —C₆H₅ | " | red |
| 94 | —C₂H₅ | " | —OCH₃ | —CH₃ | " | —CH₃ | —NO₂ | violet |
| 95 | —C₂H₄—OH | " | H | H | H | " | —CH₃ | red |
| 96 | H | " | H | —CH₃ | H | Cl | Cl | " |
| 97 | —C₂H₄Cl | " | H | " | H | Br | Br | " |
| 98 | H | " | H | —NHCOCH₃ | H | Cl | —COC₂H₅ | " |
| 99 | —C₂H₅ | " | H | Cl | H | Br | —COC₃H₇ | " |

TABLE 9

| Example No. | | Shade on polyester |
|---|---|---|
| 100 | ![structure] O₂N-C(H)=C-S-C(=N)-N=N-[phenyl(NHCOCH₃)]-NH-CH₂-CH₂-C(O)-OCH₂-[dioxane] | blue |
| 101 | ![structure] O₂N-C(CH₃)=C-S-C(=N)-N=N-[phenyl(OC₂H₅)(NHCOCH₃)]-NH-CH₂-CH₂-C(O)-O-CH₂-[dioxane] | blue |
| 102 | ![structure] C₆H₅-C=N-N=C(S)-N=N-[phenyl]-NH-CH₂-CH₂-CH₂-C(O)-O-CH₂-[dioxane] | red |
| 103 | ![structure] N=N-N-C(C₆H₅)=...-S-C-N=N-[phenyl]-NH-CH₂-CH₂-C(O)-O-CH₂-[dioxane] | red |

TABLE 9-continued

| Example No. | | Shade on polyester |
|---|---|---|
| 104 | | blue |
| 105 | | blue |
| 106 | | blue |
| 107 | | red |
| 108 | | blue |

APPLICATION EXAMPLE

7 Parts of the dyestuff produced in accordance with Example 1 are ground to a fine powder in a ball mill for 48 hours with 4 parts sodium dinaphthylmethanedisulphonate, 4 parts sodium ethylsulphate and 5 parts anhydrous sodium sulphate.

1 Part of the dyestuff preparation obtained is mixed with a little water and the suspension is added through a sieve to a dyebath containing 2 parts sodium laurylsulphate in 4000 parts water. 100 parts of scoured polyester material is added to the bath at 40°–50° C. (liquor ratio 1:40), 20 parts of chlorobenzene are added thereto, the bath is slowly heated to 100° C. and dyeing is effected from 1 to 2 hours at 95°–100° C. The dyed substrate is washed, soaped, washed again and dried. The deep equal dyeing possesses notable light-, wash-, sublimation-, thermofixation- and permanent press- fastness.

The compounds of Examples 2 to 108 may also be employed to dye polyester in analogous manner.

What is claimed is:

1. A compound of the formula

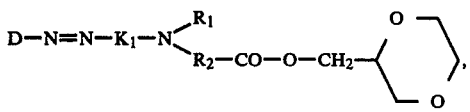

wherein

D is substituted thienyl having 1 to 3 substituents, each of which is independently chloro, bromo, nitro, cyano, methyl, phenyl, ($C_{1-2}$alkyl)carbonyl or ($C_{1-2}$alkoxy)carbonyl, with the proviso that the maximum number of any one member of the group consisting of chloro, bromo, nitro, cyano and methyl is two and the maximum number of any one member of the group consisting of phenyl, ($C_{1-2}$alkyl)carbonyl and ($C_{1-2}$alkoxy)carbonyl is one; thiazolyl; benzothiazolyl; benzoisothiazolyl; substituted thiazolyl, substituted benzothiazolyl or substituted benzoisothiazolyl having 1 or 2 substituents each of which is independently chloro, bromo, nitro, cyano, methyl, thiocyano, sulfamoyl or $C_{1-2}$alkylsulfonyl, with the proviso that the maximum number of any one member of the group consisting of methyl, thiocyano, sulfamoyl and $C_{1-2}$alkylsulfonyl is one; 5-phenyl-1,3,4-thiadiazolyl-2 or 4-phenyl-1,3,5-thiadiazolyl-2, $K_1$ is

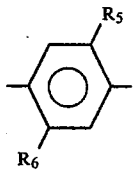

or 1,4-naphthylene,
wherein
$R_5$ is hydrogen, chloro, bromo, methyl, methoxy or ethoxy, and
$R_6$ is hydrogen, chloro, bromo, methyl, methoxy, ethoxy, ($C_{1-2}$alkyl)carbonylamino or chloroacetamido,
$R_1$ is hydrogen; $C_{1-4}$alkyl; $C_{2-4}$alkenyl; $C_{2-4}$alkyl or $C_{2-4}$alkenyl monosubstituted by chloro, bromo, hydroxy, cyano, $C_{1-4}$alkoxy, phenoxy, phenyl, formyloxy, ($C_{1-4}$alkyl)carbonyloxy, benzoyloxy, ($C_{1-4}$alkoxy)carbonyl, ($C_{1-4}$alkoxy)carbonyloxy, ($C_{1-4}$alkyl)carbamoyloxy or di-($C_{1-4}$alkyl)carbamoyloxy or

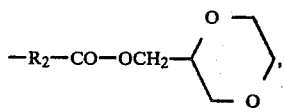

with the proviso that $R_1$ is hydrogen, $C_{1-4}$alkyl or $C_{2-4}$alkenyl when $K_1$ is 1,4-naphthylene, and each $R_2$ is $C_{1-4}$alkylene or $C_{2-4}$alkylene-O-$C_{2-4}$alkylene, with the proviso that when $R_1$ is

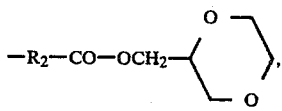

the two $R_2$'s are identical, with the proviso that the molecule is free of

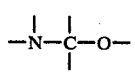

radicals.

2. A compound of the formula

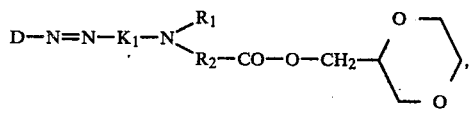

wherein
D is substituted phenyl having 1 to 3 substituents each of which is independently chloro, bromo, iodo, nitro, cyano, methyl, methylsulfonyl, methoxy, formyl, ($C_{1-2}$alkyl)carbonyl, ($C_{1-2}$alkoxy)carbonyl, benzoyl, thiocyano, tolylsulfonyl, sulfamoyl, $C_{1-2}$alkylsulfamoyl, di-($C_{1-2}$alkyl)sulfamoyl, carbamoyl, ($C_{1-2}$alkyl)carbamoyl, di-($C_{1-2}$alkyl)carbamoyl, phenylcarbamoyl, trifluoromethyl, phenyl, ($C_{1-2}$alkyl)carbonylamino, phenylazo, chlorophenylazo, nitrophenylazo, dichlorophenylazo, dinitrophenylazo or chloronitrophenylazo, with the provisos that (i) the maximum number of any one member of the group consisting of chloro, bromo, iodo, nitro, cyano, methyl and methylsulfonyl is two and the maximum number of any one of the other substituents is one and (ii) D bears a single substituent selected from the group consisting of phenylazo, chlorophenylazo, nitrophenylazo, dichlorophenylazo, dinitrophenylazo and chloronitrophenylazo, $K_1$ is

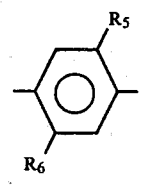

or 1,4-naphthylene,
wherein
$R_5$ is hydrogen, chloro, bromo, methyl, methoxy or ethoxy, and
$R_6$ is hydrogen, chloro, bromo, methyl, methoxy, ethoxy, ($C_{1-2}$alkyl)carbonylamino or chloroacetamido,
$R_1$ is hydrogen; $C_{1-4}$alkyl; $C_{2-4}$alkenyl; $C_{2-4}$alkyl or $C_{2-4}$alkenyl monosubstituted by chloro, bromo, hydroxy, cyano, $C_{1-4}$alkoxy, phenoxy, phenyl, formyloxy, ($C_{1-4}$alkyl)carbonyloxy, benzoyloxy, ($C_{1-4}$alkoxy)carbonyl, ($C_{1-4}$alkoxy)carbonyloxy, ($C_{1-4}$alkyl)carbamoyloxy or di-($C_{1-4}$alkyl)carbamoyloxy or

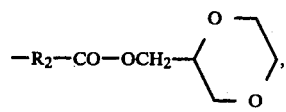

with the proviso that $R_1$ is hydrogen, $C_{1-4}$alkyl or $C_{2-4}$alkenyl when $K_1$ is 1,4-naphthylene, and each $R_2$ is $C_{1-4}$alkylene or $C_{2-4}$alkylene-O-$C_{2-4}$alkylene, with the proviso that when $R_1$ is

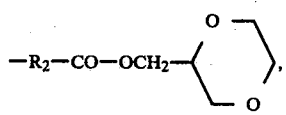

the two $R_2$'s are identical, with the proviso that the molecule is free of

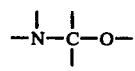

radicals.

3. A compound of the formula

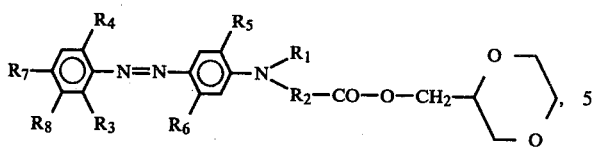

wherein

R$_1$ is hydrogen; C$_{1-4}$alkyl; C$_{2-4}$alkenyl; C$_{2-4}$alkyl or C$_{2-4}$alkenyl monosubstituted by chloro, bromo, hydroxy, cyano, C$_{1-4}$alkoxy, phenoxy, phenyl, formyloxy, (C$_{1-4}$alkyl)carbonyloxy, benzoyloxy, (C$_{1-4}$alkoxy)carbonyl, (C$_{1-4}$alkoxy)carbonyloxy, (C$_{1-4}$alkyl)carbamoyloxy or di-(C$_{1-4}$alkyl)carbamoyloxy or

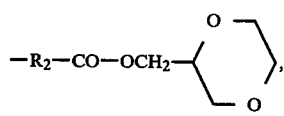

each

R$_2$ is C$_{1-4}$alkylene or C$_{2-4}$alkylene-O-C$_{2-4}$alkylene, with the proviso that when R$_1$ is

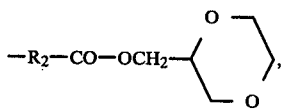

the two R$_2$'s are identical,

R$_3$ is hydrogen, chloro, bromo, iodo, methylsulfonyl or cyano,

R$_4$ is hydrogen, chloro, bromo, iodo, nitro, methyl, methoxy, cyano or trifluoromethyl, R$_5$ is hydrogen, chloro, bromo, methyl, methoxy or ethoxy, R$_6$ is hydrogen, chloro, bromo, methyl, methoxy, ethoxy, (C$_{1-2}$alkyl)carbonylamino or chloroacetamido, R$_7$ is nitro, methylsulfonyl, sulfamoyl, methylsulfamoyl, dimethylsulfamoyl or 2-chloro-4-nitrophenylazo, R$_8$ is hydrogen, chloro, bromo, methyl, methoxy or (C$_{1-2}$alkyl)carbonylamino, with the provisos that (i) R$_8$ is hydrogen when R$_3$ is chloro, bromo, iodo, methylsulfonyl or cyano and (ii) R$_8$ is hydrogen, chloro, bromo, methyl or (C$_{1-2}$alkyl)carbonylamino when R$_4$ is methoxy, with the proviso that the molecule is free of

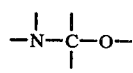

radicals.

4. The compound according to claim 3, having the formula

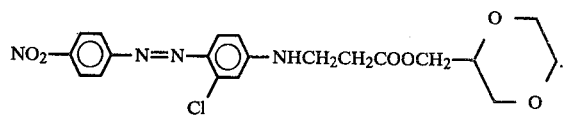

5. The compound according to claim 3, having the formula

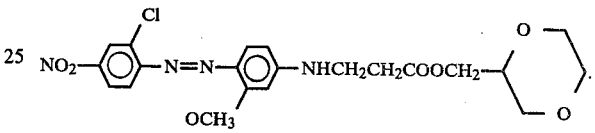

6. The compound according to claim 3, having the formula

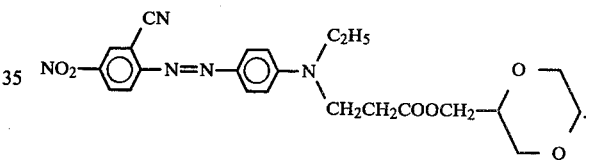

7. The compound according to claim 3, having the formula

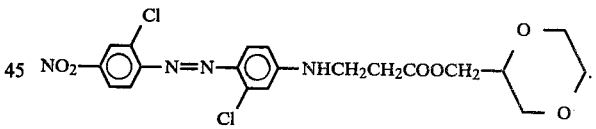

* * * * *